United States Patent [19]
Watanabe et al.

[11] Patent Number: 5,093,204
[45] Date of Patent: Mar. 3, 1992

[54] VIBRATION-DAMPING COMPOSITE SHEET STEEL

[75] Inventors: Yukichi Watanabe, Yokohama; Tomeji Doi, Kanagawa; Masafumi Yoshida; Hidekazu Tsubone, both of Hiroshima; Norio Chiba, Saitama; Kunio Kawasaki, Hiroshima; Masahiro Dohi, Hiroshima; Hiroshi Kodama, Hiroshima; Yoshitaka Takamiya, Hiroshima, all of Japan

[73] Assignees: Nippon Kokan Kabushiki Kaisha, Tokyo; Mazda Motor Corporation, Hiroshima, both of Japan

[21] Appl. No.: 604,328

[22] Filed: Oct. 26, 1990

Related U.S. Application Data

[63] Continuation of Ser. No. 157,067, Feb. 2, 1988, abandoned, which is a continuation of Ser. No. 875,220, Jun. 7, 1986, abandoned.

[30] Foreign Application Priority Data

Jun. 28, 1985 [JP] Japan .............................. 60-140431
Jun. 28, 1985 [JP] Japan .............................. 60-140432

[51] Int. Cl.$^5$ ............................................ C23C 26/00
[52] U.S. Cl. ..................................... 428/463; 156/321; 156/322; 148/253
[58] Field of Search ................. 428/463; 156/321, 322; 148/253

[56] References Cited

U.S. PATENT DOCUMENTS

| | | | |
|---|---|---|---|
| 3,794,529 | 2/1974 | Thompson | 148/6.15 Z |
| 3,850,700 | 11/1974 | Heller | 148/6.15 Z |
| 3,996,074 | 12/1976 | Rakeshaw | 148/6.15 Z |
| 4,447,493 | 5/1984 | Driscoll | 428/463 |
| 4,483,730 | 11/1984 | Honda | 156/322 |

*Primary Examiner*—Sam Silverberg
*Attorney, Agent, or Firm*—Fleit, Jacobson, Cohn, Price, Holman & Stern

[57] ABSTRACT

A vibration-damping composite sheet steel made by sandwiching a viscoelastic material between two steel sheets. A rust proofing coating which generates no gaseous matter is formed on one surface of each of the steel sheets which is contacted with the viscoelastic material. The coating is a phosphate coating having no water of crystallization with a coating weight per unit area of 0.5 g/m$^2$ or over, or a galvanized zinc coating including no zinc oxide.

3 Claims, 3 Drawing Sheets

FIG. 3

FIG. 4 formula maximum blank diameter [mm] vs. phosphate coating weight per unit area (for each side) [g/m²]

VIBRATION-DAMPING COMPOSITE SHEET STEEL

This application is a continuation of application Ser. No. 07/157,067, filed on Feb. 2, 1988, now abandoned which is a continuation of Ser. No. 07/875,220, filed on June 17, 1986, now abandoned.

BACKGROUND OF THE INVENTION

The present invention relates to vibration-damping composite sheet steel.

To prevent the occurrence of vibration in the structural and other members of various machines and appliances, vehicles, ships, etc., various methods have been used in the past such as adjusting the installation foundations, increasing the thickness of the members themselves, applying a vibration-damping material to the members and spraying or applying to the members a polymer solution which exhibits a vibration—damping function. Particularly, in view of the recent strengthening in the regulation of noise caused by vehicles, etc., in cities, there has been a tendency, as a countermeasure, toward using materials having a vibration-damping function for the component parts of vehicles, etc., and composite materials including intermediate layers composed of substances having a vibration-damping function have been developed as such materials.

This type of vibration-damping composite sheet steel is made by for example laminating a layer of viscoelastic material, e.g., plastic material of about 0.1 to 0.6 mm thick, for example, between two steel sheets of about 1.0 mm thick, for example, and this construction is intended to effectively perform a function of rapidly converting the imparted vibration energy to heat energy by virtue of plastic deformation of the viscoelastic material layer and thereby effectively damping the vibrations.

In this connection, a comparison between the vibration-damping functions of the vibration-damping composite sheet steel and the ordinary sheet steel in terms of reverberation times shows that in the case of the ordinary sheet steel 500 seconds are required before the vibrations die out to attain a given value as compared with about 1 second required for the vibration-damping composite sheet steel.

It is to be noted that while the vibration-damping composite sheet steel gives rise to no inconvenience but produces great effects so far as it is simply used as a sheet material, various troubles will be caused if the composite sheet steel is for example formed into a desired shape by press working or its surface is subjected to a baking process after the press working.

The inventors have conducted some experiments on the press working of the vibration-damping composite sheet steel into a desired shaped form as will be described hereunder. First, where the vibration-damping composite sheet steel used, as starting steel sheets, steel sheets whose surfaces were not subjected to any surface treatment, there was the danger of causing rust on the bonded surfaces of the steel sheets and the viscoelastic material and separating the bonded surfaces in the course of the actual use.

To overcome this deficiency, the vibration-damping composite sheet steel used comprised starting steel sheets which were subjected to electrogalvanizing and then subjected to a phosphate treatment to improve the adhesion of the coatings. As a result, the occurrence of rust on the bonded surfaces of the steel sheets and the viscoelastic material layer was prevented. However, the occurrence of a blistering phenomenon and hence the separation of the bonded surfaces took place during the baking operation (at 180° C. for 20 minutes) after the press working.

Since this was considered to have been caused by the previously mentioned phosphate treatment of the steel sheets, starting steel sheets subjected only to a surface treatment or electrogalvanization and not to the phosphate treatment were used. However, the rate of occurrence of cracks during press working was increased to exceed 50%, whereas if the viscoelastic material used was for example an ethylene acrylate copolymer resin including carboxyl groups, the same blistering phenomenon as mentioned previously too, place on the bonded surfaces during the baking finish operation after the press working.

From the results of this series of experiments it has been found that the use of the conventional vibration-damping composite sheet steel as a starting blank for press-worked shapes gives rise to some problems as mentioned above.

SUMMARY OF THE INVENTION

It is the primary object of the present invention to provide a vibration-damping composite sheet steel which can be used in the manufacture of press-worked shapes requiring sophisticated processing operations. More particularly, it is an object of the invention to provide a vibration-damping composite sheet steel which does not suffer the occurrence of cracks by press working and the occurrence of a blistering phenomenon due to a baking operation following the press working.

To accomplish the above objects, in accordance with one aspect of the invention, a vibration-damping composite sheet steel sandwiches a viscoelastic material between two steel sheets and each of the steel sheets is formed with a rust proofing coating not generating gaseous matter on at least one surface thereof contacting with the viscoelastic material.

In accordance with another aspect of the invention, a vibration-damping composite sheet steel sandwiches a viscoelastic material between two steel sheets and each of the steel sheets has a phosphate coating on one surface not contacting with the viscoelastic material and a rust proofing coating of the type which produces no gaseous matter on the other surface contacting with the viscoelastic material.

In accordance with one embodiment of the invention, said rust proofing coating is a phosphate coating free of water of crystallization therefrom, said rust proofing coating is formed with a coating weight per unit area (for each suface) of 0.5 g/m² or over. In accordance with another embodiment of the invention, said rust proofing contacting is a galvanized zinc coating including no zinc oxide.

In accordance with still another aspect of the invention, a vibration-damping composite sheet steel is made by subjecting both surfaces of each of two steel sheets to a phosphate treatment, heating the steel sheets up to 160° to 220° C. thereby removing the water of crystallization from the phosphate coatings, placing a viscoelastic material between the steel sheets and pressure bonding the viscoelastic material to the steel sheets.

With the vibration-damping composite sheet steel according to the invention, the surfaces of the steel sheets are treated as mentioned previously so that a phosphate coating is applied to the outer surface of each of the steel sheets and the inner surface of each steel sheet contacting the viscoelastic material is formed with a rust proofing coating which produces no gaseous matter or a heat-treated phosphate coating containing no water of crystallization or alternatively a zinc coating with no zinc oxide in the case of a galvanized steel sheet. Thus, the composite sheet steel is excellent in vibration-damping properties, corrosion resisting properties and working properties and has no danger of causing any blistering due to a heating operation such as a high-temperature baking operation.

The vibration-damping composite sheet steel according to the invention has the following excellent characteristics by virtue of the above-mentioned construction.

(1) The corrosion-resisting properties and working properties are excellent.

(2) There is no danger of causing any blistering during a baking finish after the press working.

(3) The vibration-damping characteristic is so excellent that the dissipation factor $\mu$ max is not less than 0.1.

BRIEF DESCRIPTION OF THE INVENTION

FIG. 3 is a partial sectional view of a press test piece.

FIG. 4 is a graph showing the relation between the phosphate coating weight per unit area and the press formability.

DESCRIPTION OF THE PREFERRED EMBODIMENT

Some experiments were conducted on the basis of the results of the experiments conducted as mentioned at the beginning.

First, in order to investigate the causes of the blistering phenomena caused by the use of the phosphate coatings, vibration-damping composite sheet steel test pieces were prepared by electrogalvanizing (4 g/m$^2$) and then phosphatizing (2 g/m$^2$) the surfaces of steel sheets, heating the steel sheets to 100° C., 120° C., 140° C., 160° C., 180° C., 200° C. and 220° C., respectively, in a few seconds in an induction heating unit, cooling after holding the steel sheets at these temperatures for 3 minutes and then sandwiching a viscoelastic material between each pair of the steel sheets. Then, the vibration-damping composite sheet steels were left to stand at 200° C. for 20 minutes in an electric furnace thereby measuring the occurrence of blistering on the test pieces and also the residual moisture contents of the heat-treated steel sheets were measured. The state of blistering was given in terms of δt mm given by the following equation and the residual moisture content was given in terms of mg/m$^2$.

Δt = (thickness of test piece after heat treatment)
    − (thickness of test piece before heat treatment)

Figure 1:
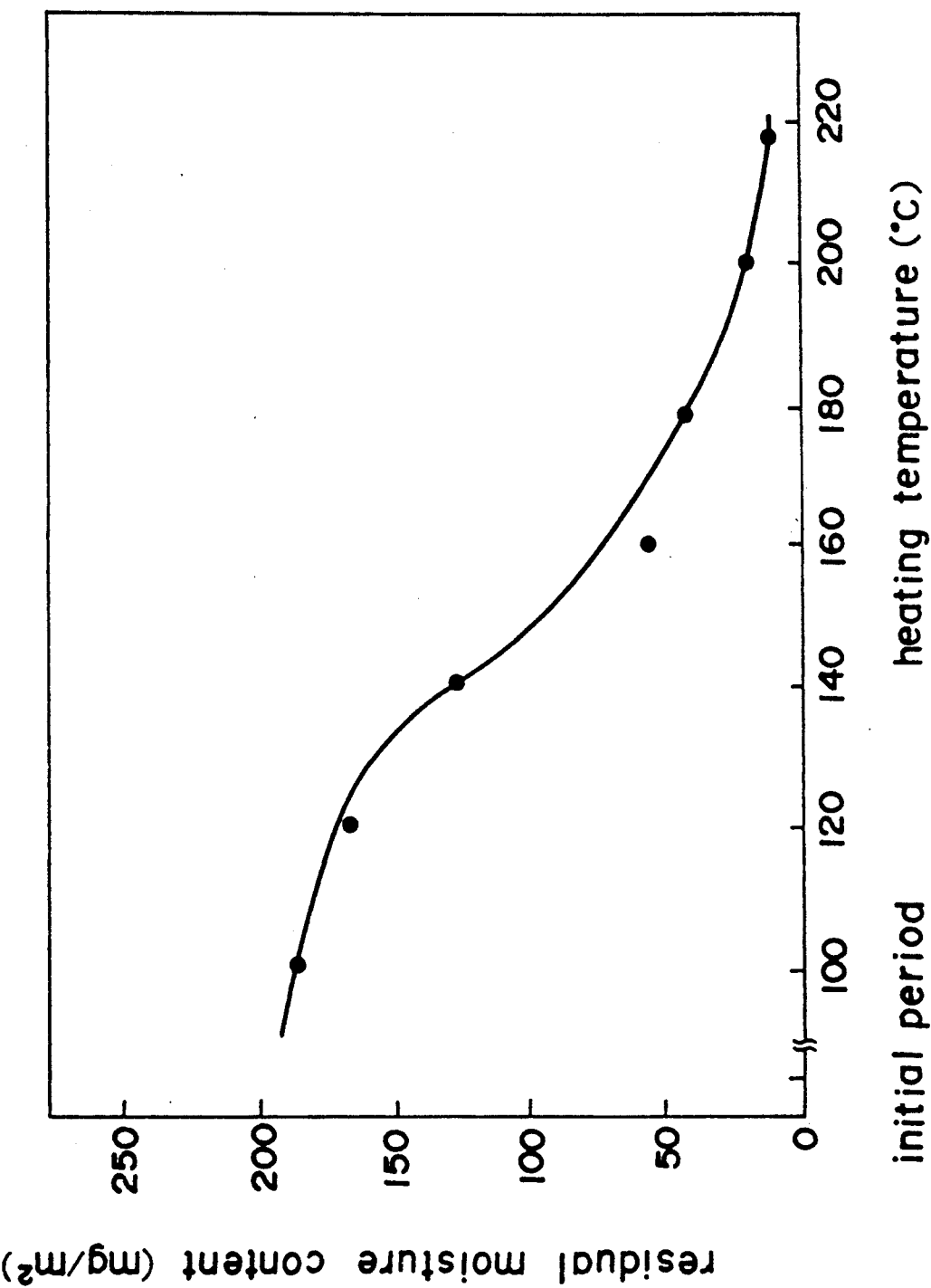
FIG. 1 is a graph showing the relation between the heating temperature and the residual moisture content in an experiment of heating and removing water of crystallization from steel sheets subjected to a phosphate treatment.
Figure 2:
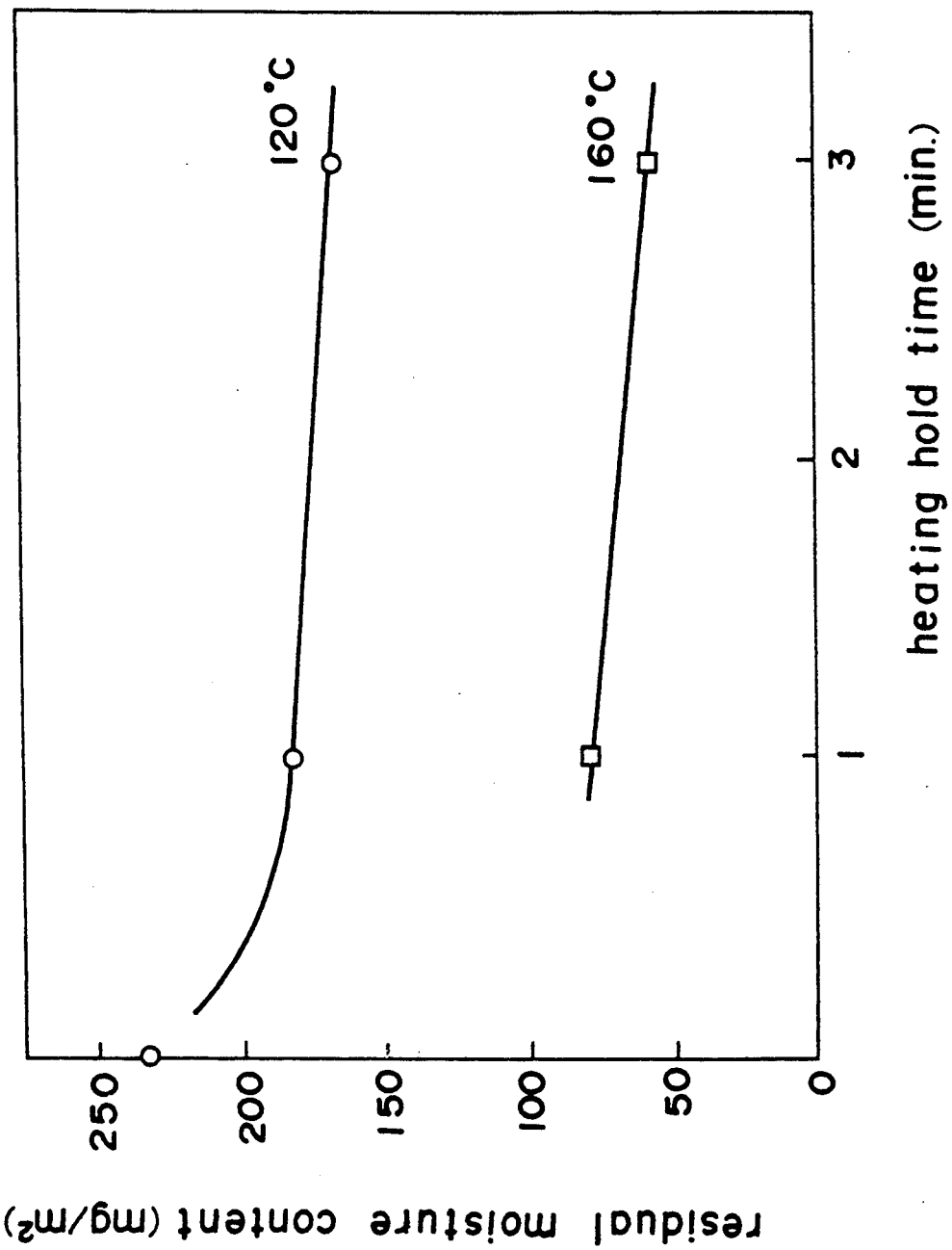
FIG. 2 is a graph showing the relation between the heating hold time and the residual moisture content in the same experiment.

The results of the experiments are shown in FIGS. 1 and 2. FIG. 1 is a graph showing the relation between the heating temperature and the residual moisture content and FIG. 2 is a graph showing the relation between the heating hold time and the residual moisture content. It is to be noted that FIG. 3 shows the results of the tests performed at typical heating temperatures. The following Table 1 shows the results of these tests and the Table shows the same heating hold time of 3 minutes because it has been found that at the typical heating temperatures of 120° C. and 160° C. the heating hold times of greater than 1 minute, particularly 3 minutes result in stable values owing to their effects on the residual moisture contents as shown in FIG. 2.

TABLE 1

| Test No. | Heating temperature | Heating hold time | Blister | Residual moisture content |
|---|---|---|---|---|
| 1 | 100° C. | 3 minutes | 0.066 mm | 188 mg/m$^2$ |
| 2 | 120° C. | " | 0.066 mm | 167 mg/m$^2$ |
| 3 | 140° C. | " | 0.035 mm | 129 mg/m$^2$ |
| 4 | 160° C. | " | 0.010 mm | 60 mg/m$^2$ |
| 5 | 180° C. | " | 0.005 mm | 44 mg/m$^2$ |
| 6 | 200° C. | " | 0.003 mm | 23 mg/m$^2$ |
| 7 | 220° C. | " | 0.003 mm | 16 mg/m$^2$ |

Generally, the occurrence of a blistering phenomenon gives rise to no problem in practical use if its thicknss Δt is not greater than 10 μm. Thus, as shown in FIG. 1 and Table 1, the heating temperature must be 160° C. or over, preferably 180° C. or over. Also, as shown in the Figure, the residual moisture content practically remains constant at temperatures higher than 220° C. and therefore no further increase in effect can be expected even if the heating temperature is increased further.

Then, tests were made to see the relation between the phosphate coating weight per unit area and press formability of vibration-damping composite sheet steels. In other words, vibration-damping composite sheet steels such as mentioned previously were prepared by electrogalvanizing both surfaces of steel sheets of 0.7 mm, subjecting both surfaces of each steel sheet to a phosphate treatment with the coating weight per unit area (for each surface) ranging from 0° to 10.2g/m$^2$ and sandwiching a layer of viscoelastic material between each pair of the steel sheets so as to contact with the phosphate coating sides. Then, circular test blanks respectively corresponding to the different phosphate coating weights were prepared from the composite sheet steels. The blanks were tested by the press tester shown in FIG. 3 to see the relation between the phosphate coating weight per unit area and the working properties. In the Figure, numeral 1 designates a punch of 100 mmφ, 2 a die of 103.5 mmφ, 3 a test blank, R$_1$ the radius, 5 mm, of the arcuated peripheral portion of the punch 1, and R$_2$ the radius, 2.5 mm, of the die 2. The blank holding force P is 35 tons.

Under these pressing conditions, the diameter of the test blank 3 was increased gradually thereby determining the maximum blank diameter that could be press formed without being ruptured. Greater the maximum blank diameter is, more excellent will be considered the formability. FIG. 4 is a graph showing the relation between the phosphate coating weight per unit area and the formable maximum blank diameter. As shown in the Figure, the phosphate coating weights of less than 0.2 g/m$^2$ show the same results as those of the blanks which were not subjected to the phosphate treatment, whereas the phosphate coating weights of 0.2 g/m$^2$ to 0.5 g/m$^2$ show considerably varying results, although the phosphate coatings prove to be effective in some measure. However, it will be seen that the coating weight of greater than 0.5 g/m² improves and stabilizes the formability considerably as compared with those obtained without any phosphating treatment. It is to be noted that the prevailing range of phosphate coating weights per unit area is from 1 to 5 g/m².

On the basis of these test results, a vibration-damping composite sheet steel was made by applying an electrogalvanized zinc coating of 4 g/m² to both surfaces of cold rolled steel sheets of 0.7 mm thick, subjecting the surfaces of the steel sheets to a phosphating treatment with a coating weight per unit area of 2 g/m² (for each surface), heating the steel sheets to 180° C. and laminating the steel sheets with an ethylene acrylate copolymer resin of 0.1 mm thick.

This vibration-damping composite sheet steel was used to form an oil pan with the result that as shown in the following Table, a satisfactory oil pan was produced which solved all of the problems due to the use of the conventional vibration-damping composite sheet steel, that is (1) the occurrence of rust on the bonded surfaces of the steel sheets and the viscoelastic material layer, (2) the occurrence of cracks during press working, and (3) the occurrence of a blistering phenomenon during a baking finish after the press working.

rial which is used as a vibration-damping material and thicknesses of from 0.3 mm to 0.6 mm may be used.

Then, as described in connection with the test results at the beginning, the occurrence of cracks during the press working was as high as over 50% in the case where the starting steel sheets consisted of steel sheets subjected, as its furnace treatment, only to electrogalvanizing and not to any phosphate treatment and there was the occurrence of a blistering phenomenon on the bonded surfaces during the baking finish operation of the press worked sheet steel in the case where the viscoelastic material used was one including carboxyl groups, e.g., ethylene acrylate copolymer resin. This is considered to be due to the fact that the zinc oxide on the surfaces of the galvanized zinc layers of the steel sheets reacts with the carboxyl groups in the viscoelastic material and produces water which is in turn heated and converted to steam thereby causing blisters on the bonded surfaces.

Thus, in the manufacture of the vibration-damping composite sheet steel, the zinc oxide on the surfaces of the galvanized zinc layers of the steel sheets contacting with the viscoelastic material layer was removed thus preventing the occurrence of any gaseous matter due to

TABLE 2

| Contents of treatment | Processing of steel sheet | | | Effect | | |
|---|---|---|---|---|---|---|
| | Amount of corrosion | | | | | |
| | Galvanizing g/m² | Phosphating g/m² | Heating | Press formability (rejection rate) | Corrosiveness | Blistering |
| A | 4 | 2 | None | 1/16 | ⊚ | ○ |
| B | 4 | 2 | None | 1/51 | ⊚ | X |
| C | 4 | None | None | 14/27 | ○ | ○ |

Note 1: Contents of steel sheet treatment
A: Both surface are galvanized and then phosphatized
B: Both surface are galvanized and then phosphatized
C: Both surfaces are electrogalvanized
Note 2: Press formability
Numerator represents the number of rejects and denominator represents the total number
Note 3: Corrosion resistance and blistering
⊚ good, ○ fairly good, X reject This is considered due to the measures including the prevention of rusting through the rust proofing treatment of the bonded surfaces of the steel sheets and the resin effected by the electrogalvanizing, the improved press formability owing to the phosphate treatment applied to the both surfaces of the vibration-damping composite sheet steel and the prevention of blistering on the resin layer due to the heating of the phosphatized steel sheets and the resulting removal of the water of crystallization contained in the phosphate coatings.

Thus, in accordance with the invention there was provided the vibration-damping composite sheet steel having excellent characteristics in that it was excellent in corrosion resistance and working properties and was capable of preventing the occurrence of blistering during the baking finish after the working and forming and ensuring a vibration damping characteristic (dissipation factor) μ max of 0.1 or over.

It is to be noted that the steel sheets used with the invention indicate not only the electrogalvanized steel sheets used in the above-mentioned embodiment but also hot rolled steel sheets, cooled rolled steel sheets, hot-dip galvanized steel sheets, metal cemented steel sheets, zinc-type galvanized steel sheets (galvanized iron), etc. Also, the steel sheets of thicknesses ranging from 0.2 mm to 1.6 mm are used.

Also, ethylene acrylate copolymer resin, modified polyethylene resin, modified polypropylene resin, vinyl acetate resin, etc., may be used for the viscoelastic matethe heating during processing. Also, on the basis of a consideration that the occurrence of cracks during a press operation is due to the elimination of the phosphate treatment and hence the loss of the lubricating properties of phosphate coatings, the tests were made as shown in FIG. 3 to see the relation between the phosphate coating weight per unit area and the press formability and the graph of FIG. 4 showing the test results were studied. Thus, as shown in FIG. 4, if the phosphate coating weight per unit area is not greater than 0.2 g/m², the press formability is the same with that of the one not subjected to the phosphate treatment, whereas if the coating weight is between 0.2 g/m² and 0.5 g/m², the press formability varies considerably, although some effect of the phosphate coating is admitted. However, it is confirmed that if the coating weight is 0.5 g/m² or more, the press formability is improved considerably as compared with that of the one not subjected to the phosphate treatment. It is to be noted that generally the prevalent phosphate coating weight per unit area is between 1 g/m² and 5 g/m².

On the basis of the knowledge obtained by these tests, a vibration-damping composite sheet steel according to the invention was produced in such a manner that during a prelamination degreasing operation of two cooled rolled steel sheets each having a thickness of 0.7 mm and subjected on both surfaces to an electrogalvanation of 4 g/m² and on one surface to a phosphate treatment with a coating weight per unit area of 2 g/m², the zinc oxide on the galvanized zinc layers was reacted with EDTA (ethylendiaminetetracetic acid) added to a degreasing solution so as to change the zinc oxide to a soluble complex salt and dissolve it into the degreasing solution and thereby remove it and then an ethylene acrylate copolymer resin was sandwitched between the two steel sheets.

This vibration-damping composite sheet steel was used in the production of an oil pan and the thus produced oil pan was satisfactory in that it solved all the problems encountered in the use of the conventional vibration-damping composite sheet steel, that is, (1) the prevention of rusting on the bonded surfaces of the steel sheets and the viscoelastic material layer, (2) the occurrence of cracks during press working and (3) the occurrence of a blistering phenomenon during a baking operation after the press working.

ized, one of the surfaces is further subjected to a phosphate treatment and the zinc oxide on the other surface or the galvanized zinc layer is removed. Thus, as shown in Table 3, the vibration-damping composite sheet steel has excellent performance characteristics in that it is excellent in corrosion resisting properties and working properties, prevents the occurrence of blistering due to baking after the working and ensures a vibration-damping characteristic (dissipation factor) $\mu$max of 0.1 or over.

What is claimed is:

1. A method of making a vibration-damping composite sheet steel, comprising the steps of:
    galvanizing both surfaces of each of two steel sheets;
    removing zinc oxide at least on the surface of the sheets which will contact a viscoelastic material;
    applying a phosphate treatment to the surface of each of two steel sheets which will not contact the vis-

TABLE 3

| Steel sheet | Surface not contacting viscoelastic material | | Surface contacting viscoelastic material | | Effect | | |
|---|---|---|---|---|---|---|---|
| | Galvanizing, g/m² | Phosphate treatment, g/m² | Galvanizing, g/m² | Phosphate treatment, g/m² | Press formability (reject rate) | Corrosion resistance | Blistering |
| Comparative example | 4 | — | 4 (without EDTA treatment) | — | 14/27 | ○ | Δ |
| Comparative example | 4 | 2 | 4 | 2 | 1/51 | ◉ | X |
| Embodiment | 4 | 2 | 4 (with EDTA treatment) | — | 1/19 | ○ | ○ |

Note 1: Press formability numerator: number of rejects denominator: total number
Note 2: ◉ excellent ○ good Δ fairly good X reject The above results are considered to be due to the effects including the prevention of rusting owing to the rust proofing treatment applied to the bonded surfaces of the steel sheets and the resin, the improved press formability owing to the phosphate treatment applied to the surfaces of the vibration-damping composite sheet steel and the prevention of blistering on the bonded surfaces owing to the removal of the zinc oxide formed on the galvanized zinc layer surfaces.

In accordance with the invention, the steel sheets having rust proofing coatings denote electrogalvanized steel sheets, hot-dip galvanized steel sheets, etc. In this case, the galvanized steel sheets must be formed with coatings having the zinc oxide removed by the use of EDTA or the like or by a mechanical method such as grinding. Also, it is possible to prevent the occurrence of blistering during high-temperature baking by the use of steel sheets with rust proofing coatings which are practically free of zinc oxide, such as, metal cemented steel sheets or zinc-type galvanized steel sheets (galvanized iron). Also, the steel sheets of thicknesses ranging from 0.2 mm to 1.6 mm are used.

Vibration-damping materials having carboxyl groups, such as, ethylene acrylate copolymer resin and vinyl acetate resin may be used as the viscoelastic material and thicknesses of from 0.3 mm to 0.6 mm may be used.

In the manufacture of a vibration-damping composite sheet steel according to the invention, after both surfaces of each of steel sheets have been electrogalvancoelastic material;
heating each said steel sheet up to 160° to 220° C. to remove water of crystallization contained in phosphate coatings on each said steel sheets; and
sandwiching the viscoelastic material between said steel sheets and bonding the same together under pressure, said viscoelastic material being a resin material containing carboxyl groups.

2. A vibration-damping composite sheet steel, consisting essentially of:
    two steel sheets; and
    a viscoelastic material sandwiched between the two steel sheets, wherein the steel sheets are first galvanized on a surface which does not contact the viscoelastic material and on a surface which does contact the viscoelastic material and zinc oxide is removed at least one the surface of the sheets which does contact the viscoelastic material and second coated with a phosphate coating on the surface which does not contact the viscoelastic material, wherein further the viscoelastic material is a resin material containing carboxyl groups.

3. A vibration-damping composite sheet steel according to claim 2, wherein the phosphate coating has the water of crystallization removed therefrom, and wherein further the phosphate coating on each of said steel sheets has a coating weight per unit area of 0.5 g/m² or greater.

* * * * *